United States Patent [19]

Floessel et al.

[11] 4,297,523
[45] Oct. 27, 1981

[54] GAS PIPE CABLE

[75] Inventors: Carl D. Floessel, Fislisbach; Klaus Floessel, Wettingen, both of Switzerland

[73] Assignee: BBC Brown, Boveri & Company, Ltd., Baden, Switzerland

[21] Appl. No.: 152,148

[22] Filed: May 21, 1980

[30] Foreign Application Priority Data

Jul. 5, 1979 [CH] Switzerland .................. 6277/79

[51] Int. Cl.³ .................... H01B 9/06; H02G 5/06
[52] U.S. Cl. ............................ 174/27; 174/99 B; 174/140 R
[58] Field of Search ............ 174/10, 13, 16 B, 21 CA, 174/27, 28, 99 R, 99 B, 99 E, 140 R, 144, 148, 149 B; 138/108, 112, 113, 114

[56] References Cited

U.S. PATENT DOCUMENTS 2,306,527 12/1942 Daniels ..................... 174/27 X
3,919,456 11/1975 Floessel ................... 174/27
4,251,681 2/1981 Diessner ................... 174/28

FOREIGN PATENT DOCUMENTS 2801505 7/1979 Fed. Rep. of Germany ........ 174/28

Primary Examiner—Laramie E. Askin

Attorney, Agent, or Firm—Burns, Doane, Swecker & Mathis

[57] ABSTRACT

A three phase gas pipe cable is disclosed which has at least one gas pipe cable section in which three phase conductors are arranged in a triangular configuration within an enclosing pipe. Each phase conductor is supported by at least one supporting insulator such that the longitudinal axis of each phase conductor is substantially parallel to the longitudinal axis of the enclosing pipe. The supporting insulator is connected by a slide bearing member to the enclosing pipe. The slide bearing member accommodates an insulator foot end of the supporting insulator in such a manner that the supporting insulator is capable of motion in the direction of the longitudinal axis of the enclosing pipe. When the phase conductors linearly expand as a result of differential heating of the phase conductors, each phase conductor is free to expand in the longitudinal direction thereby moving the supporting insulator associated with each individual phase conductor a corresponding amount in the axial direction with no detrimental mechanical effects to any part of the gas pipe cable. A single compensator for each phase conductor in each gas pipe cable section is sufficient to absorb the thermal expansion of each phase conductor.

16 Claims, 5 Drawing Figures

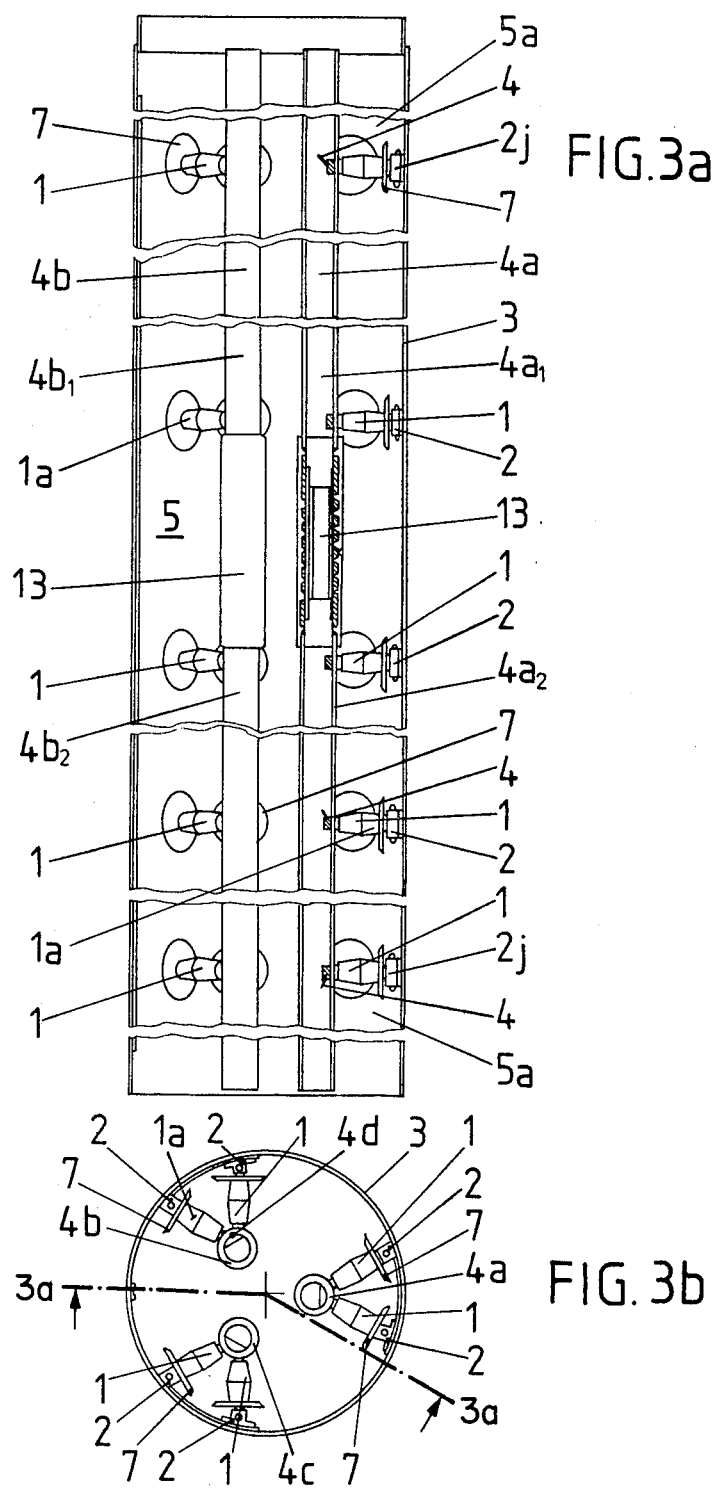

GAS PIPE CABLE

BACKGROUND OF THE INVENTION

The present invention relates to gas pipe cables, and more particularly to a three phase gas pipe cable having three phase conductors arranged in an enclosing pipe and supported therein by supporting insulators.

In a conventional gas pipe cable, such as that disclosed in U.S. Pat. No. 3,919,456, three phase conductors are arranged within a common enclosing pipe. The phase conductors are arranged in a triangular configuration, and are each held on ring supports by supporting insulators. At each supporting location of each phase conductor two supports are provided. The longitudinal axes of the two supports intersect at an angle. Each axis is positioned with respect to the axes of the supports of the other phase conductors such that when the gas pipe cable is viewed in cross-section, the axis of each supporting insulator passes substantially through the centers of two phase conductors. In this simple and effective gas pipe arrangement, electrodynamic current forces occurring between the phase conductors, particularly in the case of a short circuit, may be controlled with little effort. However, such conventional gas pipe cables are subject to detrimental mechanical effects caused by differential heating of the phase conductors.

In conventional gas pipe cables the phase conductors are supported by supporting devices arranged periodically in the enclosing pipe. When the phase conductors are exposed to differential heating, the phase conductors undergo differential linear expansion. The differential linear expansion applies nonuniform shear stresses or torques to the supporting devices. Therefore, the supporting devices must be solidly anchored to the enclosing pipe using special methods which are cumbersome, labor intensive and costly. If such special methods are not employed, however, the differential linear expansion of the phase conductors may cause the supporting devices to overturn.

It is therefore an object of the present invention to provide a gas pipe cable in which the differential heating of the phase conductors, even in the case of short circuits, will not have detrimental mechanical effects on any part of the cable.

SUMMARY OF THE INVENTION

According to a preferred embodiment of the present invention, a gas pipe cable includes phase conductors which are supported in an enclosing pipe in such a manner that each phase conductor is individually dilatable. As such, when the phase conductors are exposed to differential heating, each phase conductor is free to individually expand in the axial or longitudinal direction. Consequently, the supporting insulators cannot be stressed to overturning. In a gas pipe cable according to the present invention, a single thermal expansion compensator is sufficient for each phase conductor in each section of the gas pipe cable.

According to a preferred embodiment of the present invention, a gas pipe cable includes shielding electrodes which permit relatively uniform fields to exist between the phase conductors and the enclosing pipe even though the phase conductors may each be in relatively different positions with respect to their supporting insulators and associated apparatus as a result of differential thermal expansion.

BRIEF DESCRIPTION OF THE DRAWINGS

The preferred embodiments of the present invention are described with reference to the accompanying drawings wherein like members bear like reference numerals, and wherein:

FIG. 3a is an axial sectional view of a gas pipe cable section through the lines 3a—3a and viewed in the directions of the arrows of FIG. 3b; and FIG. 3b is a longitudinal cross-sectional view of a gas pipe cable section according to the present invention.

DESCRIPTION OF THE PREFERRED EMBODIMENTS

Figure 1:
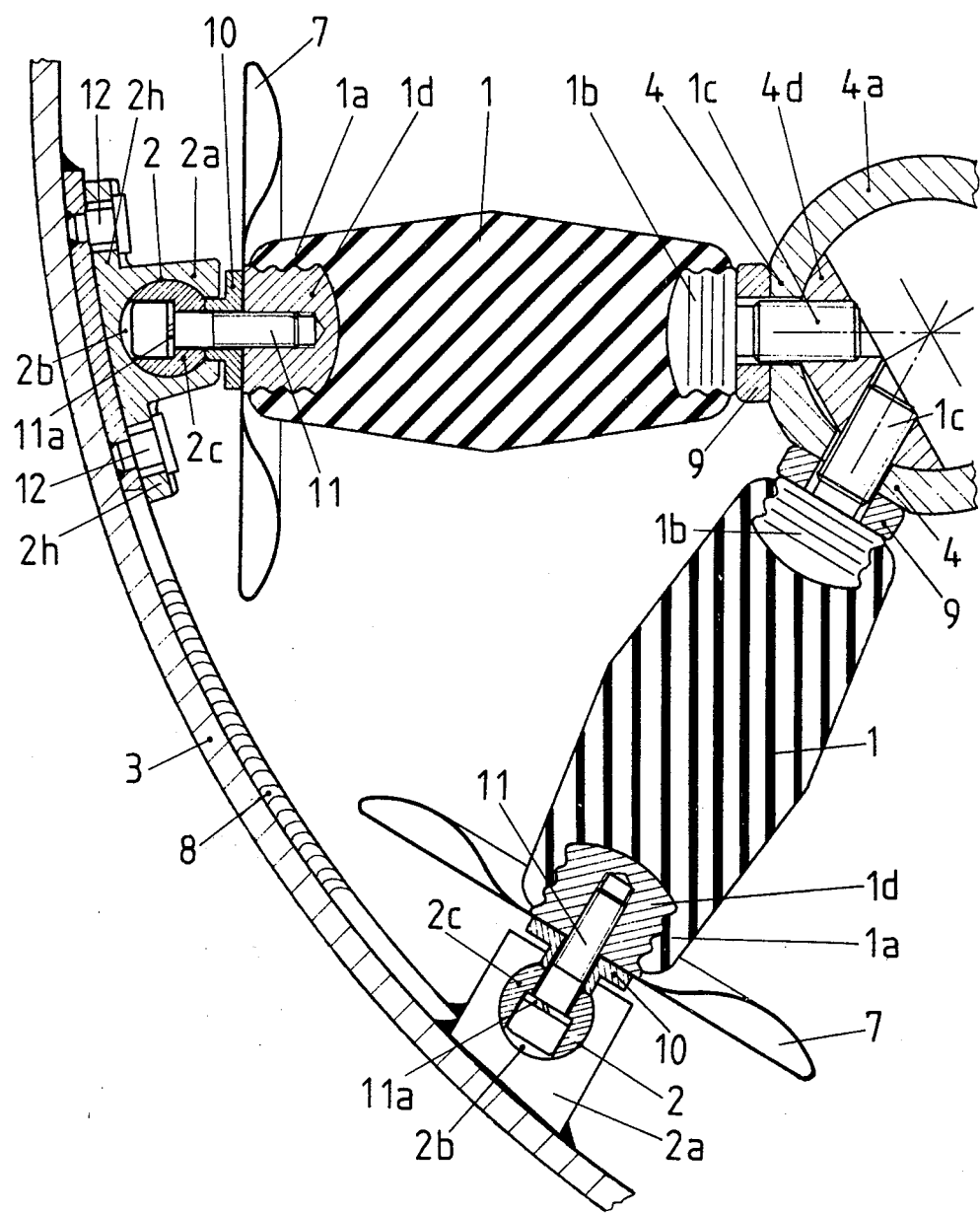
FIG. 1 is a transverse cross-sectional view of a gas pipe cable according to the present invention in which a phase conductor supported by two supporting insulators is illustrated.

Referring to FIG. 1, a gas pipe cable includes a phase conductor 4a supported at each of two supporting locations 4 by a supporting insulator 1. Each supporting insulator 1 is fixedly connected to the phase conductor 4a at the support points 4 of the phase conductor by an inlet fitting 1b included at the end of the supporting insulator facing the phase conductor 4a. The inlet fitting includes a threaded lug 1c which threadedly engages a threaded piece 4d included on the phase conductor 4a. The threaded piece 4d includes two threaded holes which receive the threaded lugs 1c associated with each of the supporting insulators 1 supporting the phase conductor 4a. A washer 9 is included between each supporting insulator 1 and the phase conductor 4a.

When the threaded lugs 1c are threadedly connected to the threaded piece 4d so that the supporting insulators 1 are connected to the phase conductor 4a, the longitudinal axes of the supporting insulators 1 intersect substantially at the center of the phase conductor 4a. An angle of intersection is included between the axes of the supporting insulators. The angle of intersection between the longitudinal axes of the supporting insulators associated with phase conductor 4a, and the angles of intersection between the supporting insulators associated with phase conductors 4b and 4c (FIG. 3b) are equal in magnitude.

Each supporting insulator 1 includes a foot 1a which accommodates an inlet fitting 1d. Each supporting insulator 1 includes a shielding electrode 7 at the foot 1a.

The inlet fitting 1d connects the supporting insulator 1 to a slide bearing 2. A sliding bolt 2c of the slide bearing 2 is connected by a coupling nut 11 to the foot 1a of the insulator. A fastening device 11a, such as a lock washer, is included. And, an intermediate piece 10 is included between the sliding bolt 2c and the inlet fitting 1d.

The sliding bolt 2c is accommodated in a groove 2b included in a slide bearing block 2a in a bearing-like manner. The groove 2b is substantially parallel to the longitudinal axis of the phase conductor 4a, and is substantially parallel to the longitudinal axis of an enclosing pipe 3. So accommodated, the sliding bolt 2c is capable of slide motion in the direction of the longitudinal axis of the enclosing pipe 3, and of the phase conductors 4a, 4b and 4c.

The slide bearing block 2a is fastened to the enclosing pipe 3. The slide bearing block includes a bearing block foot 2h which accommodates a lock nut 12. The lock nut 12 is fastened to an arcuate sheet metal part 8 welded to the enclosing pipe 3. Alternately, the slide bearing block 2a may be directly welded to the arcuate sheet metal part 8 and to the enclosing pipe 3. The arcuate sheet metal part 8 spatially separates the two slide bearing blocks 2a associated with a particular phase conductor from each other.

When differential heating of the phase conductors occurs in a gas pipe cable according to the present invention, such as that which may occur between phase conductors located at the top and at the bottom of an underground or buried three phase gas pipe cable, the corresponding differential linear expansion of the phase conductors will not stress the gas pipe cable according to the present invention to failure. The slide bearings 2 allow each phase conductor 4a, 4b and 4c to freely expand in the axial direction by permitting each supporting insulator 1 rigidly connected to a phase conductor to freely slide in the axial direction in response to the linear expansion of that phase conductor. In a gas pipe cable according to the present invention, neither the individual insulators 1, nor the slide bearing block 2a, nor any other part associated with the mounting of the phase conductors 4a, 4b or 4c will be stressed to failure as a result of differential heating of the phase conductors.

Due to the differential linear expansion of the phase conductors, the slide bearing blocks associated with each phase conductor may be located at relatively different locations in the enclosing pipe 3 with respect to the slide bearing blocks associated with each of the other phase conductors. In order to render the fields between the phase conductors 4a, 4b, 4c and the enclosing pipe 3 as uniform as possible, the shielding electrode 7 is included at the foot 1a of each supporting insulator 1.

Figure 2A:
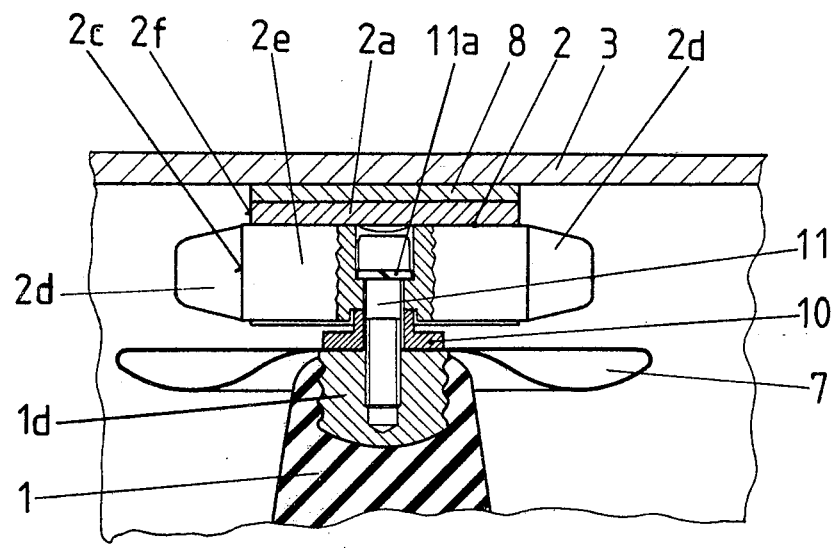
FIG. 2a is a cross-sectional view of a foot of a supporting insulator according to one embodiment of the present invention.

Referring to FIG. 2a, in one embodiment of the present invention the sliding bolt 2c includes a cylindrical part 2e and two ends 2d in the shape of truncated conical sections. The slide bearing block 2a includes an end face 2f at each end of the slide bearing block. The truncated conical section ends 2d facilitate mounting of the sliding bolt 2c.

Figure 2B:
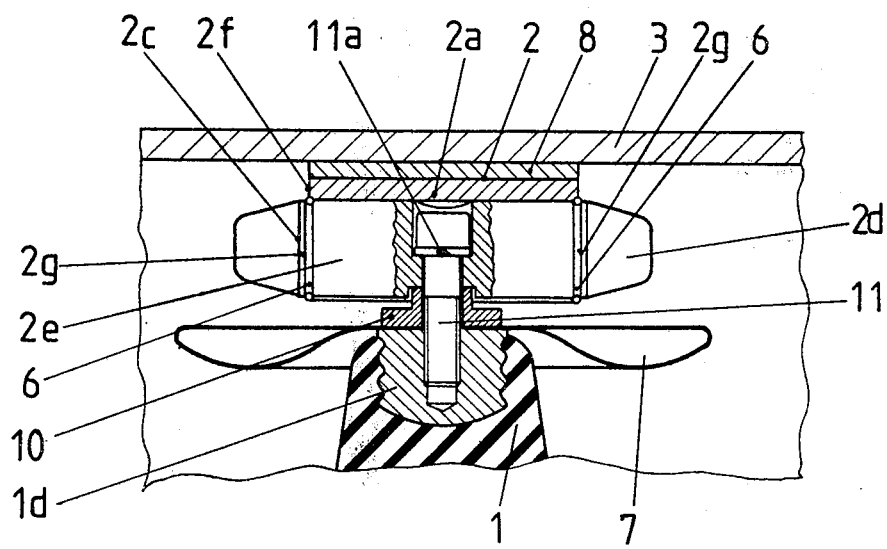
FIG. 2b is a cross-sectional view of a foot of a supporting insulator according to another embodiment of the present invention.

Referring to FIG. 2b, in another embodiment of the present invention the sliding bolt 2c includes two annular grooves 2g. Each annular groove 2g accommodates a locking washer 6. When so accommodated, the locking washers 6 are separated from each other by a distance equal to the distance separating the end faces 2f of the slide bearing block 2a. The locking washers 6 cooperate with the end faces 2f to prevent relative movement between the sliding bolt 2c and the slide bearing block 2a in the axial direction.

Referring to FIG. 3a, a gas pipe cable according to the present invention includes a gas pipe cable section 5 having ends 5a. A thermal expansion compensator 13 associated with phase conductor 4a is included between ends of phase conductor sections 4a₁ and 4a₂. Similarly, a thermal expansion compensator 13 is included between ends of phase conductor sections 4b₁ and 4b₂ of phase conductor 4b, and between ends of phase conductor sections 4c₁ and 4c₂ of phase conductor 4c (not illustrated).

Slide bearings 2j located at each end 5a of the gas pipe cable section 5 are locked by locking washers 6 as illustrated in FIG. 2b. Consequently, linear thermal expansion of the phase conductors located between the two ends 5a may take place only in the direction of the compensators 13, which absorb such expansions. The slide bearings 2 located between locked slide bearings 2j are not locked.

Referring to FIG. 3b, a cross-sectional view of the gas pipe cable section 5 of FIG. 3a is illustrated. The phase conductors 4a, 4b, 4c are each supported by two supporting insulators 1. The supporting insulators 1 are arranged in the enclosing pipe 3 such that the longitudinal axis of each supporting insulator substantially corresponds to that of another supporting insulator. So arranged, the longitudinal axis of each supporting insulator substantially passes through the longitudinal axis of two phase conductors.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A three phase gas pipe cable comprising:
    at least one gas pipe cable section, said cable section including an enclosing pipe having a hollow interior region and said enclosing pipe having a longitudinal axis;
    three phase conductors included within said hollow interior region of said enclosing pipe, each of said phase conductors having a longitudinal axis and being disposed such that the longitudinal axis of each of said phase conductors is substantially parallel to the longitudinal axis of said enclosing pipe;
    two supporting insulators for supporting each of said three phase conductors at a support location, said supporting insulators being included within said hollow interior region of said enclosing pipe and each of said supporting insulators having:
    a longitudinal axis, the axes of the two supporting insulators for each phase conductor intersecting with an included angle of intersection, the angle of intersection of the two supporting insulators for each phase conductor having the same magnitude for each of the three phase conductors, and each longitudinal axis of said supporting insulators substantially passing through the longitudinal axis of two phase conductors;
    a first end, said first end supporting one of said phase conductors at said support location; and
    an insulator foot end, said foot end facing said enclosing pipe; and
    a slide bearing member, said slide bearing member being included in said hollow interior region of said enclosing pipe and being connected to said enclosing pipe, and said slide bearing member accommodating said insulator foot end of said supporting insulator such that said supporting insulator is capable of motion in the direction of the longitudinal axis of said enclosing pipe, said slide bearing member comprising:
    a slide bearing block member, said slide bearing block member being connected to said enclosing pipe, and said slide bearing block member having a bearing block groove disposed substantially parallel to the longitudinal axis of said enclosing pipe;

a sliding bolt member, said sliding bolt member having a first end accommodated in said bearing block groove, and having a second end connected to said insulator foot end of said supporting insulator, each of said first and second ends being truncated conical sections; and said sliding bolt member further including a cylindrical section located between said first and second ends, said first end being separated from said cylindrical section by a first annular groove, and said second end being separated from said cylindrical section by a second annular groove, and first and second end faces, said end faces being separated from each other and said first and second annular grooves being separated from each other in the longitudinal direction by a first distance.

2. The gas pipe cable according to claim 1 wherein said cable further comprises:

means for fastening at least one supporting insulator for each of said three phase conductors in said gas pipe cable section in said longitudinal direction.

3. The gas pipe cable according to claim 2 wherein said means for fastening includes a first washer member accommodated in said first annular groove, and a second washer member accommodated in said second annular groove; and further wherein said first and second washer members cooperate with said first and second end faces of said slide bearing block member so as to limit slide bolt member movement in said longitudinal direction.

4. The gas pipe cable according to claim 3 further comprising:

one thermal expansion compensator associated with each of said three phase conductors and included in each of said gas pipe cable sections.

5. In a three phase gas pipe cable having at least one gas pipe cable section and having in said at least one gas pipe cable section three phase conductors arranged within an enclosing pipe in a triangular configuration, said three phase conductors each being held at support locations by at least one supporting insulator at each support location, a conductor supporting apparatus for each phase conductor comprising:

at least one supporting insulator for each phase conductor in each gas pipe cable section;

an insulator foot included on said supporting insulator, said foot facing said enclosing pipe;

a slide bearing, said slide bearing including:

a slide bearing block, said slide bearing block being rigidly connected to said enclosing pipe, and said slide bearing block having:

a bearing block groove, said bearing block groove being disposed substantially parallel to the longitudinal axis of said enclosing pipe and substantially parallel to the longitudinal axis of said phase conductor; and a sliding bolt member, said sliding bolt member being rigidly connected to said insulator foot included on the supporting insulator, and said sliding bolt member having a free-standing end accommodated in said bearing block groove;

whereby said supporting insulator is capable of motion in the direction of the longitudinal axis of said enclosing pipe and in the direction of the longitudinal axis of said phase conductor.

6. The conductor supporting apparatus according to claim 5 further comprising:

means for locking at least one of said sliding bolt members included in said gas pipe cable section in order to limit motion of said supporting insulator in the direction of the longitudinal axis of said enclosing pipe and in the direction of the longitudinal axis of said phase conductor.

7. The conductor supporting apparatus according to claim 5 further comprising:

a shielding electrode, said shielding electrode being included between said sliding bolt member and said insulator foot.

8. The conductor supporting apparatus according to claim 5:

wherein at least one phase conductor is supported at said support location by two supporting insulators; and further wherein said two supporting insulators are fixedly arranged with respect to each other.

9. A three phase gas pipe cable comprising:

at least one gas pipe cable section, said cable section including an enclosing pipe having a hollow interior region and said enclosing pipe having a longitudinal axis;

three phase conductors included within said hollow interior region of said enclosing pipe, each of said phase conductors having a longitudinal axis and being disposed such that the longitudinal axis of each of said phase conductors is substantially parallel to the longitudinal axis of said enclosing pipe;

at least one supporting insulator for each of said three phase conductors, said supporting insulators being included within said hollow interior region of said enclosing pipe and each of said supporting insulators having:

a first end, said first end supporting one of said phase conductors at a support location; and an insulator foot end, said foot end facing said enclosing pipe; and a slide bearing member, said slide bearing member being included in said hollow interior region of said enclosing pipe and being connected to said enclosing pipe, and said slide bearing member accommodating said insulator foot end of said supporting insulator such that said supporting insulator is capable of motion in the direction of the longitudinal axis of said enclosing pipe, said slide bearing member comprising:

a slide bearing block member, said slide bearing block member being connected to said enclosing pipe, and said slide bearing block member having a bearing block groove disposed substantially parallel to the longitudinal axis of said enclosing pipe; and a sliding bolt member, said sliding bolt member having a first free-standing end accommodated in said bearing block groove, and having a second end connected to said insulator foot end of said supporting insulator.

10. The gas pipe cable according to claim 9 further comprising:

a slide bearing block foot member included on each slide bearing block member associated with each of the supporting insulators supporting a particular phase conductor; and an arcuate sheet metal member, said arcuate sheet metal member being included in said hollow interior region of said enclosing pipe and being rigidly connected to said enclosing pipe; wherein the slide bearing block foot members associated with said particular phase conductor are connected to each other and are spaced from each other by said arcuate sheet metal member.

11. A gas pipe cable according to claim 9 wherein said sliding bolt member includes a first and a second end, and wherein each of said first and second ends are truncated conical sections.

12. The gas pipe cable according to claim 9 further comprising:
a shielding electrode, said shielding electrode being included in said hollow interior region of said enclosing pipe, and said shielding electrode being located between said sliding bolt member and said insulator foot end of said supporting insulator.

13. The gas pipe cable according to claim 9 further comprising:
means for fastening at least one supporting insulator for each of said three phase conductors in said gas pipe cable section in order to limit motion of said at least one supporting insulator in the direction of the longitudinal axis of said enclosing pipe.

14. The gas pipe cable according to claim 9:
wherein each phase conductor is supported at said support location by two supporting insulators;
wherein each supporting insulator has a longitudinal axis, and wherein the axes of the two supporting insulators for each phase conductor intersect with an included angle of intersection;
wherein the angle of intersection of the two supporting insulators for each phase conductor has the same magnitude for each of the three phase conductors; and
further wherein each longitudinal axis of said supporting insulators substantially passes through the longitudinal axis of two phase conductors.

15. The gas pipe cable according to claim 14 wherein said slide bearing member is rigidly connected to said enclosing pipe.

16. The gas pipe cable according to claim 9 wherein said first end of said sliding bolt member is substantially cylindrical, said first end being slidably accommodated in said bearing block groove.

* * * * *